United States Patent [19]

Miyahara

[11] Patent Number: 4,522,834

[45] Date of Patent: Jun. 11, 1985

[54] METHOD OF AND APPARATUS FOR PRODUCING ELECTRICALLY PROCESSED FOODSTUFFS

[75] Inventor: Kingo Miyahara, Tokyo, Japan

[73] Assignee: Dowa Co., Ltd., Tokyo, Japan

[21] Appl. No.: 611,508

[22] Filed: May 17, 1984

[30] Foreign Application Priority Data

May 25, 1983 [JP] Japan ................... 58-90804

[51] Int. Cl.³ ............. A23L 3/32; G01N 33/02; H05B 6/46
[52] U.S. Cl. ..................... 426/231; 99/358; 99/451; 219/10.81; 422/22; 426/244; 426/521
[58] Field of Search ........... 426/244, 245, 521, 231; 99/358, 451; 219/10.81, 10.55 R; 422/22

[56] References Cited

U.S. PATENT DOCUMENTS 1,754,574 4/1930 Sater .......................... 426/244
4,320,276 3/1982 Takeuchi et al. ............ 99/358

*Primary Examiner*—George Yeung
*Attorney, Agent, or Firm*—Wegner & Bretschneider

[57] ABSTRACT

A method of and an apparatus for producing a processed foodstuff by passing a current to a raw food material wherein the raw food material placed in an insulating container open on upper and lower sides is held between an upper electrode member and a lower electrode member serving concurrently as a juice receiver located on opposite sides of the raw food material through respective salt water containing contact members which are resiliently connected together by resilient connection means in an insulated condition. A current is passed between the upper and lower electrode members through a plug having a probe to heat the raw food material to a predetermined temperature to sterilize it. Juices given off by the raw food material collect in a juice trap. The insulating container containing the raw food material may be placed on a worktable in the front thereof and moved to the rear of the worktable. When it reaches a predetermined position, it is brought into contact with current passing members to pass a current between the upper and lower electrode members.

6 Claims, 17 Drawing Figures

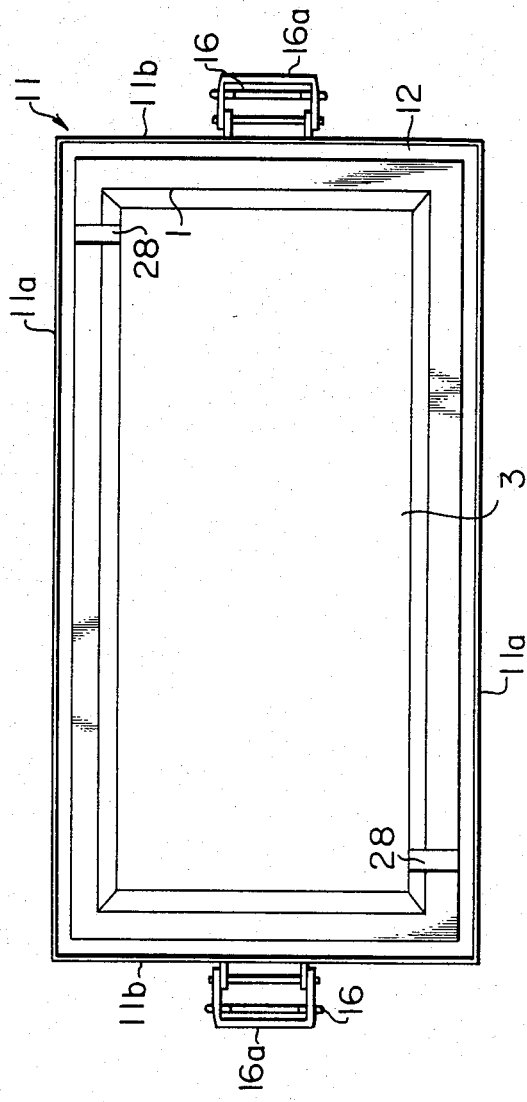
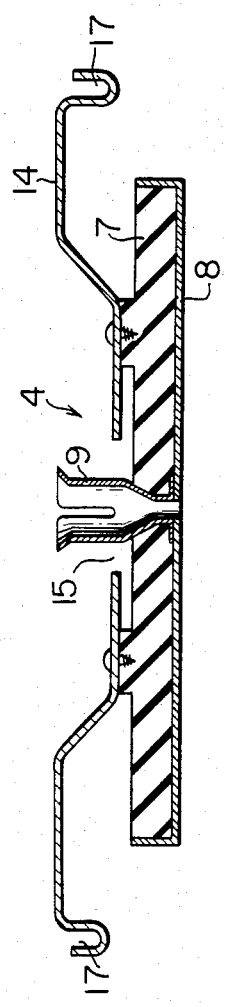
FIG. 2
FIG. 3

METHOD OF AND APPARATUS FOR PRODUCING ELECTRICALLY PROCESSED FOODSTUFFS

BACKGROUND OF THE INVENTION

1. Field of the Invention

This invention relates to methods of and apparatus for producing electrically processed foodstuffs, and more particularly it is concerned with a novel and useful method of and an apparatus for producing electrically processed foodstuffs which are suitably firm, succulent and homogeneous on a mass production basis with a high degree of efficiency, wherein a material for producing a processed foodstuff by passing an electric current is placed in a container formed of an insulating material and held under pressure between an upper electrode member and a lower electrode member serving concurrently as a receiver for juices given off by materials for producing foodstuffs and an electric current is passed to the material merely by inserting a plug provided with a probe into a socket or by moving the container with the material to be processed rearwardly of a worktable on which it is disposed while inserting a plug with a probe into a socket, to heat the material to a predetermined temperature to sterilize it. The apparatus for producing electrically processed foodstuffs according to the invention is free from the disadvantages that the juices given off by the materials might be spilled on to the surface of the worktable and render same unsanitary and that accidents might be caused to occur by a short circuit during operation, so that the operation of producing processed foodstuffs by passing an electric current can be performed in a sanitary condition without the risk of accidents being caused by a short circuit during operation.

2. Description of the Prior Art

In one type of method of and apparatus for producing processed foodstuffs known in the art, raw materials for producing processed foodstuffs, such as agricultural produces, dairy products, marine products or some other suitable materials, are quickly made tasty while being sterilized at the same time by Joule heat generated by resistance to a current passed to the materials to be processed. A method of and an apparatus of this type wherein a raw material is placed in a container formed of an insulating material which is open on both sides and then an electric current is passed to the raw material through salt water containing contact members while holding the raw material between a pair of electrode members and applying pressure thereto are disclosed in Japanese Patent Publication No. 45570/74, for example, granted to us. The method and apparatus described in this document have been worked and achieved a considerable success.

In the method and apparatus described hereinabove, it is necessary to move the pair of electrode members in reciprocatory movement to process the raw material placed in the container by passing a current thereto. More specifically, the pair of electrode members should be moved each time a current is passed to the raw material, and this has given rise to the problem that in addition to the apparatus itself becoming complex in construction, the operation of such apparatus is rendered troublesome and time-consuming, making it impossible to efficiently perform the operation of producing processed foodstuffs by passing an electric current. The raw material for producing a processed foodstuff which is placed in the container usually contains a large volume of juices to facilitate seasoning by passing a current thereto. The juices are given off by the raw material while a current is being passed to the raw material which is held between the pair of electrode members, and they seep through the container to outside and adhere to various parts of the apparatus. This has made it necessary to clean the apparatus by wiping the juices each time an electric current is passed to the raw material to be processed. As a result, operation efficiency has shown a marked reduction in performing processing of raw materials by this apparatus. However, the juices adhering to various parts of the apparatus have tended to cause a short circuit to occur, thereby inadvertently injuring the operator. An additional disadvantage is that inability to hold the raw materials to be processed between a pair of electrode members in exactly the same condition has made it impossible to continuously produce on a mass production basis such processed foodstuffs are heated to a predetermined sterilizing temperature suiting the particular raw materials.

SUMMARY OF THE INVENTION

One object of this invention is to provide a method of and an apparatus for producing processed foodstuffs by passing an electric current to raw materials to be processed which enable the operation of holding each raw material between a pair of electrode members and applying pressure thereto while salting same to be performed readily and precisely without using moving means when an electric current is passed to the raw materials, thereby simplifying the method and apparatus.

The aforesaid object can be accomplished by virtue of the feature that each raw material to be processed is placed in a container formed of an insulating material in such a manner that opposite sides of the raw material are held through salt water containing contact members between an upper electrode member and a lower electrode member serving concurrently as a receiver for juices given off by the material which are connected together through resilient means in an insulated condition, so that a predetermined pressure can be applied to the material held between the two electrode members.

Another object is to provide a method of and an apparatus for producing processed foodstuffs by passing a current to raw materials to be processed which enable processed foodstuffs of uniform quality to be produced with a high degree of efficiency without causing accidents to occur due to a short circuit which might be caused by juices given off by the raw materials or rendering the apparatus unsanitary in condition.

The aforesaid object can be accomplished by virtue of the feature that the lower electrode member is made to serve concurrently as a receiver for the juices, so that the juices given off by the raw materials can be received by the lower electrode member to allow it to collect in a juice trap provided between the container formed of an insulating material and the lower electrode member, to thereby prevent the juices leaking from the container to outside.

Still another object is to provide a method of and an apparatus for producing processed foodstuffs by passing a current to raw materials to be processed which readily enable the current to be passed to the raw materials in a preset condition, so that the raw materials can be quickly heated to a predetermined seasoning and sterilizing temperature to continuously produce processed foodstuffs of uniform quality.

The aforesaid object can be accomplished by virtue of the feature that the operation of passing a current to the raw materials to be processed can be performed by anybody by merely inserting a plug provided with a probe in a socket located in the upper electrode member on one side of each raw material to be processed, so that the operation of passing a current to the raw material can be performed in the preset condition regardless of who performs the operation.

Still another object is to provide a method of and an apparatus for producing processed foodstuffs by passing a current to raw materials to be processed which enable the raw materials to be processed with increased efficiency and safety to produce processed foodstuffs of improved flavor.

The aforesaid object can be accomplished by virtue of the feature that the container formed of an insulating material having a raw material to be treated placed therein and held between upper and lower electrode members is disposed in the front of a worktable while allowing a plug provided with a probe for checking the temperature to which the material is heated to be inserted in a socket at the upper electrode member in initial stages of operation for passing a current to the material, and moved, upon the operation of inserting the plug in the socket being finished, on the worktable to the rear thereof into contact with a pair of current passing plates to pass a current uniformly between the upper electrode member and the lower electrode member serving concurrently as a juice receiver to quickly heat the raw material to a predetermined temperature.

Still another object is to provide a method of and an apparatus for producing processed foodstuffs by passing a current to raw materials to be processed which enable processed foodstuffs to be readily produced with a high degree of efficiency in a sanitary and safe condition.

The aforesaid object can be accomplished by virtue of the features that resilient connection means kept in an insulated condition is provided to connect together a pair of electrode members including an upper electrode member and a lower electrode member serving concurrently as a juice receiver which hold between them a raw material to be processed through salt containing contact members located on opposite sides of the raw material placed in a container open on upper and lower sides while applying pressure thereto, and that an enclosure surrounding the container of an insulating material and serving as a juice trap is provided to the lower electrode member serving as a juice receiver, whereby the raw materials can be kept under uniform pressure when they are held between the upper and lower electrode members to allow processed foodstuffs of uniform quality to be readily and efficiently produced and whereby the risk of the juices given off by the raw materials to be treated leaking to outside from the container and causing injury to the operator or damage to the apparatus as by a short circuit or rendering the apparatus unsanitary can be avoided.

Still another object is to provide a method of and an apparatus for producing processed foodstuffs by passing a current to raw materials to be processed which enable the raw materials to be readily and efficiently heated to a predetermined temperature.

The aforesaid object can be accomplished by virtue of the feature that a plug-and-socket arrangement with a probe being attached to the plug is used to positively heat the raw materials to be processed to a predetermined temperature merely by inserting the plug in the socket provided to the upper electrode member, to thereby produce processed foodstuffs of uniform quality.

A further object is to provide a method of and an apparatus for producing processed foodstuffs by passing a current to raw materials to be processed which enable processed foodstuffs of uniform quality to be continuously produced efficiently without any trouble.

The aforesaid object can be accomplished by virtue of the feature that a container formed of an insulating material having a raw material to be treated placed therein and held between an upper electrode member and a lower electrode member serving concurrently as a juice receiver is located in the front of the worktable for movement from the front to the rear on the worktable and a socket for inserting a plug provided with a probe for checking the temperature to which the material is heated is provided to the upper electrode member, and that a pair of current passing plates are mounted at the rear of the worktable for passing a current uniformly between the upper and lower electrode members holding the raw material therebetween when the container of the insulating material has moved from the front of the worktable to a predetermined position at the rear of the worktable, whereby processed foodstuffs of uniform quality can be continuously produced efficiently without any trouble by performing in combination the operation of moving the container from the front of the worktable to the rear thereof and the operation of inserting the plug in the socket and withdrawing same therefrom.

Additional and other objects, features and advantages of the invention will become more apparent from the description set forth hereinafter when considered in conjunction with the accompanying drawings.

BRIEF DESCRIPTION OF THE DRAWINGS

FIG. 2 is a plan view of the apparatus shown in FIG. 1, showing the apparatus by removing the upper electrode member, salt water containing contact member on the upper side and the raw material to be processed;

FIG. 3 is a vertical sectional front view of the upper electrode member of the apparatus shown in FIG. 1;

DESCRIPTION OF THE PREFERRED EMBODIMENTS

Figure 1:
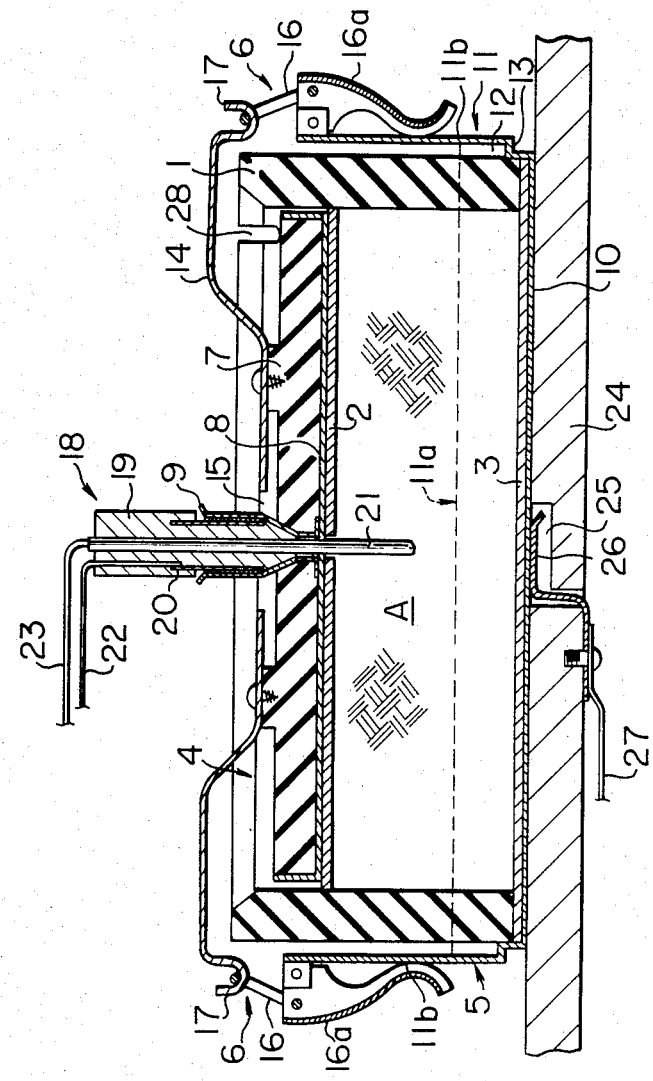
FIG. 1 is a vertical sectional front view, with certain parts being cut out, of the apparatus for producing processed foodstuffs by passing a current to raw materials to be processed comprising one embodiment of the invention suitable for carrying the method of producing processed foodstuffs by passing a current to raw materials to be processed, showing the manner in which a raw material placed in the insulating container in a pressed condition is heated to a predetermined temperature to sterilize it by inserting a plug provided with a probe in a socket.
Figure 4:
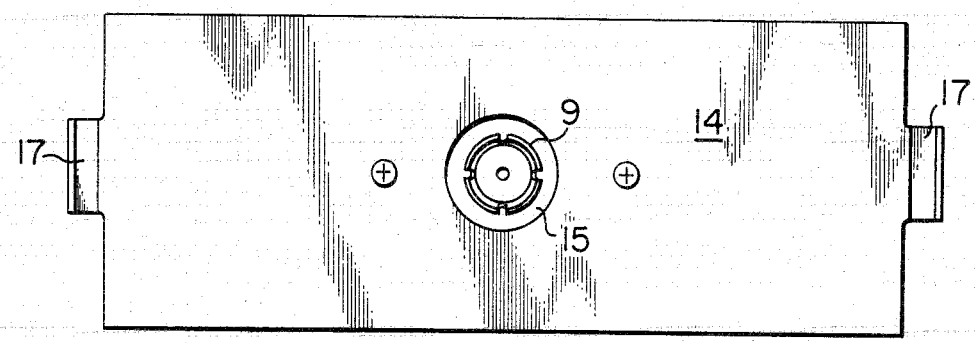
FIG. 4 is a plan view of the upper electrode member shown in FIG. 3.
Figure 5:
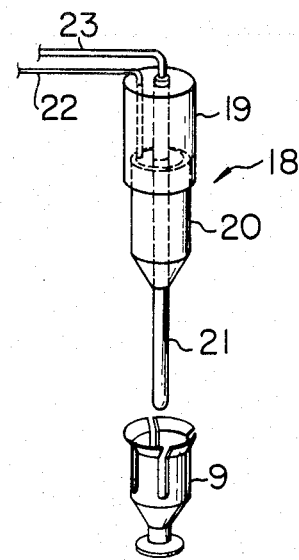
FIG. 5 is a developed perspective view, with certain parts being cut out, of the plug-and-socket arrangement of the apparatus shown in FIG. 1.

Preferred embodiments of the invention will now be described by referring to the accompanying drawings in which similar parts are designated by like reference characters.

Referring to FIGS. 1-6, the numeral 1 designates a container formed of an insulating material which is shaped like a parallelepiped and open on upper and lower sides for directly receiving a raw material A, such as an agricultural produce, dairy product, marine product or any other suitable material which is to be processed by passing a current thereto to produce a processed foodstuff of uniform quality (hereinafter to be referred to simply as a raw material A). A salt water containing contact member 2 is placed on an upper side of the material A and an upper electrode member 4 is placed on the salt water containing contact member 2. Another salt water containing contact member 3 is placed under a lower side of the raw material A and a lower electrode member 5 serving concurrently as a juice receiver is located under the salt water containing contact member 3. The upper electrode member 4 and the lower electrode member 5 serving concurrently as a juice receiver are connected together by resilient connection means 6 kept in an insulated condition, so as to apply uniform pressure to the raw material A held between the two electrode members 4 and 5 through the contacting members 2 and 3 respectively to maintain the raw material A under a predetermined pressure. The upper electrode member 4 comprises an insulating material layer 7 of a rectangular shape substantially similar in shape to the insulating container 1, and an electrically conducting plate 8 attached to the undersurface of the insulating material layer 7 and kept in intimate contact with the salt water containing contact plate 2. A socket 9 of a hollow cylindrical shape formed of a conductive material penetrates the insulating material layer 7 substantially in a central portion and has a lower end anchored to the conducting plate 8. The lower electrode member 5 serving concurrently as a juice receiver is in the form of a parallelepiped open at its upper side and comprises a bottom plate 10 and walls 11 capable of providing a juice trap 12 of a substantial area around the insulating container 1. The bottom plate 10 has shoulders 13 formed therein to allow the insulating container 1 to be immovably fitted in place on the salt water containing contact member 3 placed on the bottom plate 10. The walls 11 include front and rear walls 11a which are lower than side walls 11b to economize on material.

The resilient connection means 6 for resiliently connecting together the upper electrode member 4 and the lower electrode member 5 serving concurrently as a juice receiver is rectangular in shape and has an opening 15 formed in a central portion through which the socket 9 extends without coming into contact with the connection means 6. The resilient connection means 6 of this shape comprises plate springs 14 each secured to the insulating material layer 7 of the upper electrode member 4 through a metal fixture, and lock members 16 each secured to one of the two side walls 11b of the lower electrode member 5 serving concurrently as a juice receiver. The lock members 16 are each connected at its base to one of pivotable knobs 16a which are connected at the bases to the side walls 11b of the lower electrode member 5 serving concurrently as a juice receiver. The plate springs 14 are each formed at the outer end portion with a hooked portion 17 which detachably engages one of the lock members 16 at the forward end, so that the resilient connection means 5 resiliently connects together the upper electrode member 4 and the lower electrode member 5 serving concurrently as a juice receiver in an insulated condition to uniformly apply pressure to the raw material A held between the upper and lower electrode members 4 and 5 through the respective salt water containing contact members 2 and 3.

The numeral 18 designates a plug for passing a current to the raw material A through the socket 9 provided to the upper electrode member 4. More specifically, the plug 18 comprises a main body 19 formed of an insulating material, and a current passing plate 20 attached to an outer peripheral surface of a lower portion of the main body 19 and adapted to come into contact with an inner peripheral surface of the socket 9 when the plug 18 is inserted in the plug 9. A probe 21 for checking the temperature to which the raw material A is heated to make it tasty while sterilizing it is attached to the plug 18 in a central portion to face downwardly to provide a unitary structure. This is not restrictive, however, and the probe 21 may be formed as an entity separate from the plug 18 so that the former can be detachably attached to the latter when necessary. A lead wire 22 is connected at one end to the current passing plate 20, and another lead wire 23 is connected at one end to the probe 21. The numeral 24 designates a worktable for supporting thereon the insulating container 1 containing the raw material A held between the upper electrode member 4 and the lower electrode member 5 serving as a juice receiver and uniformly pressed, so that the operation of passing a current to the raw material A to process same can be performed. The surface of the worktable 24 is formed with a recess 25 in which is mounted an electrode contact member 26 adapted to come into contact with the bottom plate 10 of the lower electrode member 5 serving concurrently as a juice receiver. The numeral 27 designates a lead wire connected at one end to the electrode contact member 26. The numeral 28 designates a plurality of grooves formed vertically at an upper end edge of the insulating container 1 in a suitable position to allow juices given off by the raw material A to overflow.

Figure 6:
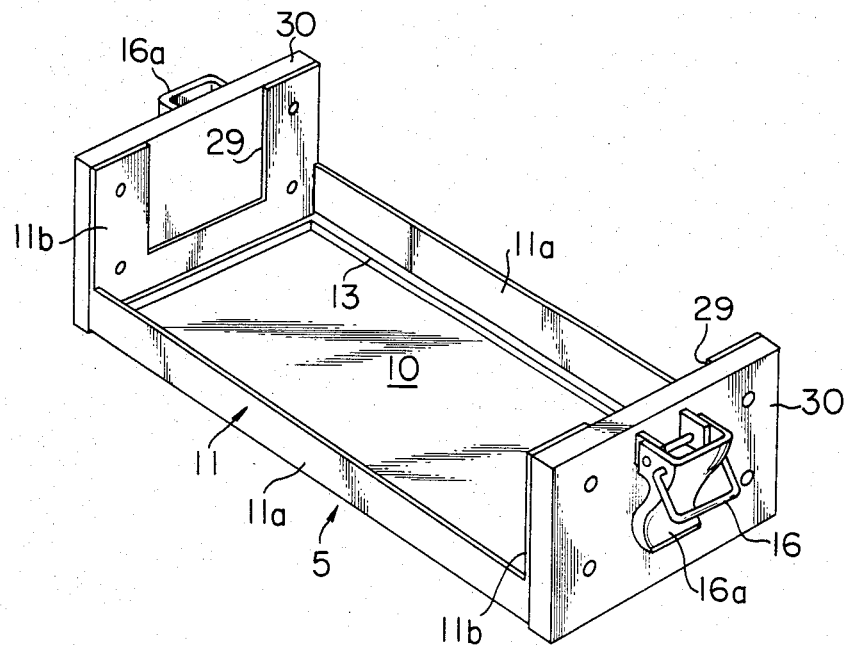
FIG. 6 is a perspective view of another constructional form of the lower electrode member serving concurrently as a juice receiver of the apparatus shown in FIG. 1.

FIG. 6 shows another constructional form of the lower electrode member 5 serving concurrently as a juice receiver in which the lock members 16 constituting the resilient connection means 6 are connected in a perfectly insulated condition to the opposite side walls 11b of the lower electrode member 5 serving as a juice receiver, to enable the processed foodstuff producing operation to be performed in an increasedly safe condition. In the constructional form shown in FIG. 6, openings 29 greater in size than the lock members 16 are formed each at one of the two side walls 11b of the lower electrode member 5, and an insulating plate 30 is attached to an outer surface of either one of the side walls 11b. Then, the pivotal knobs 16a supporting the respective lock members 16 for pivotal movement are each securely connected to an outer surface of one of the insulating plates 30, to allow the knobs 16a and lock members 16 to move in pivotal movement. This constructional form offers the advantage that the occurrence of an accident due to a short circuit can be positively avoided by virtue of the arrangement whereby the lock members 16 can be suitably connected in a perfectly insulated condition to the side walls 11b of the lower electrode member 5 serving concurrently as a juice receiver which is electrically conductive.

Figure 7:
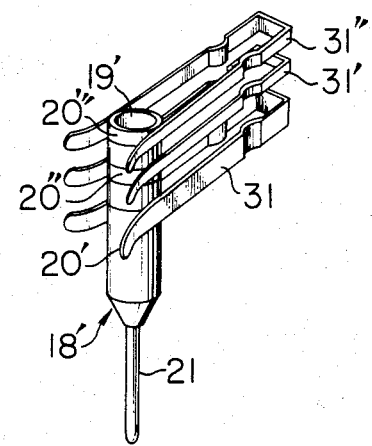
FIG. 7 is a perspective view of a modification of the plug shown in FIG. 5.

FIG. 7 shows a modification of the plug shown in FIG. 1, in which a plug 18' is capable of passing a current to the current passing plate 20 and the probe 21 by eleminating the lead wires 22 and 23 to heat the raw material A to a predetermined temperature to sterilize it. The plug 18' comprises a main body 19' formed of an insulating material, and a plurality of current passing plates 20', 20" and 20''' located at an outer peripheral surface of the main body 19' in vertically spaced apart relation. Contact pieces 31, 31' and 31" of bifurcated form are maintained in pressing contact with the current passing plates 20', 20" and 20''' respectively. When the plug 18' is inserted in the socket 9, the lower current passing plate 20' is brought into contact with the socket 9 to allow a current to pass to the two electrode members 4 and 5, and the intermediate and upper current passing plates 20" and 20''' are brought into contact with negative and positive plates of the probe 21 embedded in the main body 19' of the insulating material, to allow the temperature of the raw material A to be positively checked.

Figure 8:
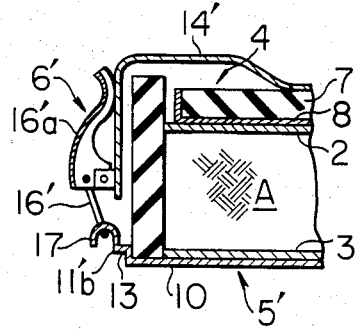
FIG. 8 is a vertical sectional front view, with certain parts being cut out, of another constructional form of the resilient connection means of the apparatus shown in FIG. 1.

FIG. 8 shows another constructional form of the resilient connection means 6 shown in FIG. 1, in which the lock members 16 can be mounted on the plate springs 14 on the right and left sides to apply pressure to the raw material A. As shown, the resilient connection means 6' comprises pivotable knobs 16'a each supporting one of lock members 16' for pivotal movement and connected to a lower end of downwardly extended and bent portions of the plate springs 14, and hooked portions 17' for engaging the lock members 16' formed at ends of the side walls 11b located on the left and right of the lower electrode member 5 serving concurrently as a juice receiver.

Figure 9:
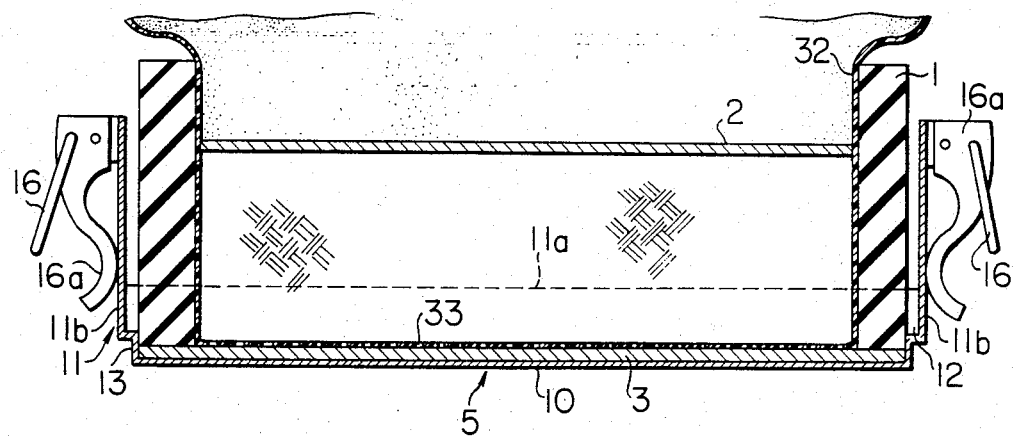
FIG. 9 is a vertical sectional view, with certain parts being cut out, of the apparatus for producing processed foodstuffs by passing a current to raw materials to be processed which comprises another embodiment, showing a raw material placed in the insulating container through a heat resisting film.

FIG. 9 shows another embodiment of the apparatus for producing processed foodstuffs by passing a current to materials to be processed, in which the raw material A to be processed is not directly placed in the insulating container 1 but through a film 32 of a heat resisting material which wraps the raw material A. In this modification, the raw material A is placed in the insulating container 1 as follows. First, the film 32 is spread and put in the insulating container 1 in such a manner that a multiplicity of current passing apertures 33 formed in the film 32 are brought into direct contact with the salt water containing contact member 3 disposed on the lower open side of the insulating container 1. Then, the raw material A is placed on the film 32 spread in the insulating container 1 and the salt water containing contact member 2 is placed on the raw material A. Thereafter, the raw material A placed on the film 32 in the container 1 is held between the upper electrode member 4 and the lower electrode member 5 serving concurrently as a juice receiver as is the case with the embodiment shown in FIG. 1 and resiliently pressed while a current is passed through the electrode members 4 and 5 to the raw material A to sterilize it to produce a processed foodstuff. The processed foodstuff obtained by the apparatus comprising the embodiment shown in FIG. 9 can be immediately packaged by the film 32 to provide a packaged foodstuff, thereby improving the hygenic level of the foodstuff processed by passing a current to the raw material A. The film 32 may be in the form of a container formed of a heat resisting material which is open at its upper side and formed with the multiplicity of current passing apertures 33 at its lower side.

Figure 10:
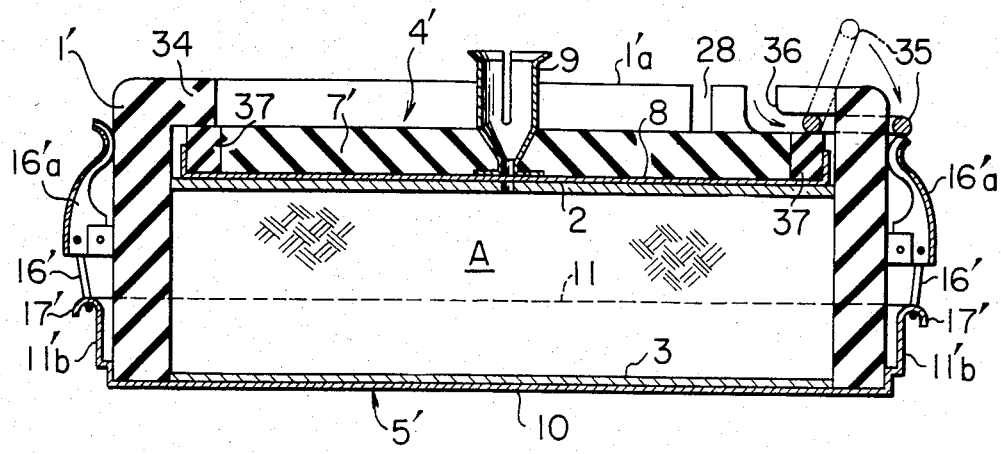
FIG. 10 is a vertical sectional front view of the apparatus for producing processed foodstuffs by passing a current to raw materials to be processed which comprises still another embodiment, showing a raw material being held in a pressed condition by using still another constructional form of resilient connection means.
Figure 11:
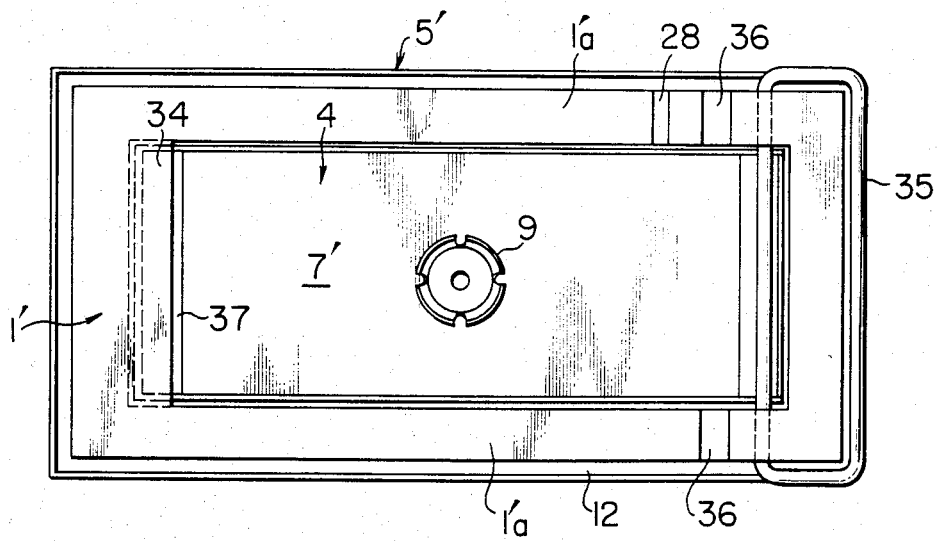
FIG. 11 is a plan view of the apparatus shown in FIG. 10.

FIGS. 10 and 11 show still another embodiment of the apparatus for producing processed foodstuffs by passing a current to materials to be processed, in which a raw material to be processed can be held in an insulated condition between the upper electrode member 4 and the lower electrode member 5 serving concurrently as a juice receiver to apply uniform pressure thereto without using the plate springs 14 of the resilient connection means 6 shown in FIG. 1. In this embodiment, the insulating container 1' shaped like a parallelepiped and open on upper and lower sides is formed at one lateral side of the open upper side with a locking ledge 34 extending slightly inwardly from an edge of the one lateral side and at an opposite lateral side of the open upper side with receptacles 36 formed in upper portions of front and rear walls 1'a of the container 1' to allow a rectangularly arranged stopper bar 35 to be freely inserted thereinto and withdrawn therefrom. The upper electrode member 4' provided with the socket 9 includes insulating resilient side pieces 37 formed of an insulating resilient material, such as urethane resin, which are attached to opposite sides of the insulating material layer 7′. The salt water containing contact members 2 and 3 are placed on opposite sides of the raw material A placed in the insulating container 1′ of the aforesaid construction. Then, the upper electrode member 4′ having one side portion thereof placed beneath the locking ledge 34 and an opposite side portion inserted in the insulating container 1′ is placed on the upper salt water containing contact member 2, and the lower electrode member 5′ serving concurrently as a juice receiver which is of the same construction as that described by referring to FIG. 8 is placed beneath the lower salt water containing contact member 3. The lock members 16′ pivotably supported by the pivotable knobs 16′a pivotably mounted on the left and right side walls of the insulating container 1′ are brought into locking engagement with the respective hooked portions 17′ of the left and right side walls 11′b of the lower electrode member 5′ serving concurrently as a juice receiver, to thereby connect together the insulating container 1′ and the lower electrode member 5′ serving concurrently as a juice receiver. At the same time, the rectangularly arranged stopper bar 35 is inserted in the receptacle 36 at the front and rear walls 1′a of the insulating container 1′ and brought into pressing engagement with the insulating resilient side piece 37 located on the side of the upper electrode member 4′ opposite the side which is inserted beneath the locking ledge 34, to thereby bias the upper electrode member 4′ downwardly. Thus, the raw material A is held between the upper and lower electrode members 4′ and 5′ in a pressed condition. Thereafter, a current is passed between the upper electrode member 4′ and the lower electrode member 5′ serving concurrently as a juice receiver through the plug 18 inserted in the socket 9, so as to uniformly heat the raw material A to a predetermined temperature to make it tasty while sterilizing it to readily produce an electrically processed foodstuff which is both delicious and wholesome.

In the embodiments of the invention shown and described hereinabove, the raw material A held between the upper electrode member and the lower electrode member serving concurrently as a juice receiver and placed in the container formed of an insulating material is heated by a current passed through the plug inserted in the socket to produce a processed foodstuff while the insulating container remains stationary on the worktable. However, the invention is not limited to this processed foodstuff production form, and processed foodstuffs can be continuously produced with increased safety and efficiency by heating the raw materials placed in presssed condition between the upper electrode member and the lower electrode member serving concurrently as a juice receiver and placed in the insulating containers while the containers are moved from the front of the worktable to the rear thereof without remaining stationary on the worktable. This apparatus suitable for procesing materials by passing a current thereto to continuously produce processed foodstuffs by moving the insulating containers on the worktable is shown in FIGS. 12–15 and described hereinafter. More specifically, the reference numeral 37 designates a worktable including a horizontal surface formed of an insulating material that can be readily installed in any position as desired. The worktable 37 is covered at its rear portion with an outer plate 38 located at the rear of the worktable 37 in an upright position and bent to extend forwardly while it is open in the forward front portion. A rectangular guide frame 39 having a larger length than the insulating container 1 and substantially similar in width thereto is placed on a top surface of the worktable 37 for guiding the insulating container 1 for movement from the front of the worktable 37 to the rear thereof in reciprocatory movement by the operator. The insulating container 1 is like a parallelepiped in shape and open on upper and lower sides as is the case with the insulating container 1 described by referring to FIG. 1 to allow a raw material A to be placed therein for processing by passing a current thereto. The upper electrode member 4 and the lower electrode member 5 serving concurrently as a juice receiver are placed on upper and lower sides respectively of the raw material A placed in the insulating container through the upper and lower salt containing contact members 2 and 3 respectively, and the upper and lower electrode members 4 and 5 are resiliently connected together by the resilient connection means 6 in an insulated condition to apply uniform pressure from above and below to the raw material A held between the two electrode members 4 and 5. The upper electrode member 4, lower electrode member 5 serving concurrently as a juice receiver and resilient connection means 6 are similar in construction to the corresponding parts described by referring to FIG. 1, except that the upper electrode member 4 and the lower electrode member 5 serving concurrently as a juice receiver are provided with vertical contact members 40 and 41 respectively for causing a current to be passed between the upper electrode member 4 and the lower electrode member 5 serving concurrently as a juice receiver when the insulating container 1 is moved to the rear of the worktable 37. More specifically, the vertical contact member 40 is supported at its base on one side of the conducting plate 8 and has connected to an upper portion of its free end a contact piece 40a bent to extent toward the rear of the worktable 37, and the vertical contact member 41 is supported at its base on one of the two side walls 11b of the lower electrode member 5 serving concurrently as a juice receiver. Current passing plates 42 and 43 are supported on insulated posts 44 and 45 respectively which are spaced apart from each other and located at the rear of the worktable 37 and adapted to be engaged by the contact piece 40a and contact member 41 respectively, to pass a current between the upper electrode member 4 and the lower electrode member 5 serving concurrently as a juice receiver when the insulating container 1 is moved to a predetermined position at the rear of the worktable. Lead wires 46 and 47 connected at one to a power source, not shown, are connected at an opposite end to the current passing plates 44 and 45 respectively. The numeral 48 designates a probe detachably inserted in the socket 9 which is adapted to be inserted in the socket 9 or withdrawn therefrom by the operator when the insulating container 1 is moved from the rear of the worktable 37 to the front thereof in the guide frame 39. A lead wire 49 connected at one end to an upper end of the probe 48 is connected at an opposite end to a temperature sensor 50 located at a front surface of the outer plate 38. Thus, as the insulating container 1 is moved to the rear of the worktable 37 and the contact piece 40a and vertical contact member 41 are brought into contact with the current passing plates 42 and 43 respectively, a current is passed between the upper electrode member 4 and the lower electrode member 5 serving concurrently as a juice receiver, to heat the raw material A held between the two electrode members 4 and 5 in a pressed condition to a predetermined temperature to sterilize it. Then, the probe 48 detects that the raw material A has been heated to the predetermined temperature and supplies the information to the temperature sensor 50 which cuts the supply of the current to the raw material A now heated to the predetermined temperature, to thereby provide a foodstuff processed uniformly by virtue of the current passed thereto.

The numeral 51 designates a ventilating fan mounted at the back of an upright portion of the outer plate 38, and the numeral 52 designates a handle formed of an insulating material for moving the insulating container 1 in the guide frame 39 placed on the worktable 37 from the rear to the back and vice versa.

Figure 12:
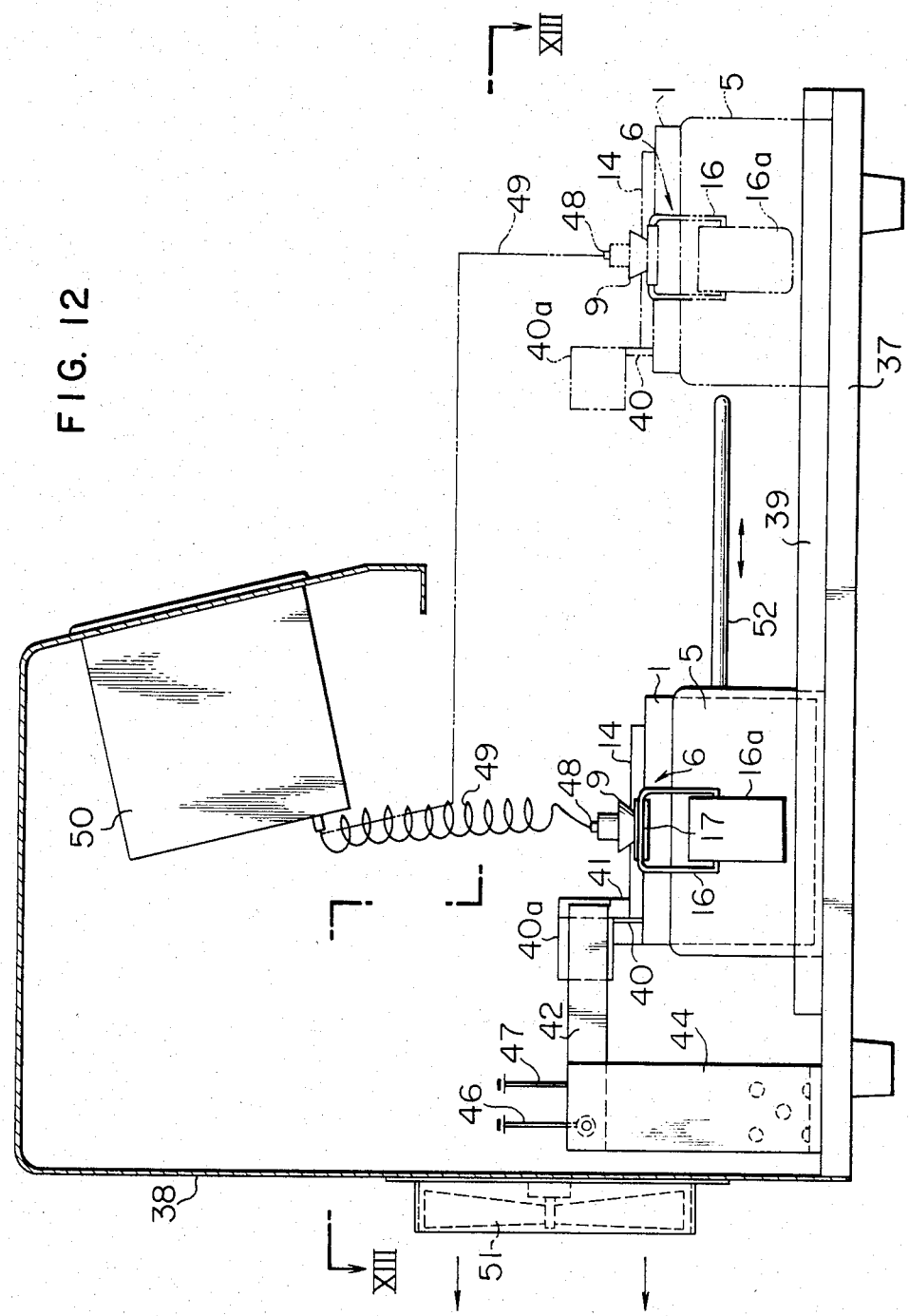
FIG. 12 is a side view of the apparatus for producing processed foodstuffs by passing a current to raw materials to be processed comprising still another embodiment which enables the processed foodstuffs to be continuously produced automatically with increased safety by moving the insulating containers each containing a raw material back and forth on the worktable, showing the raw material being processed by a current passed thereto sterilize it.
Figure 13:
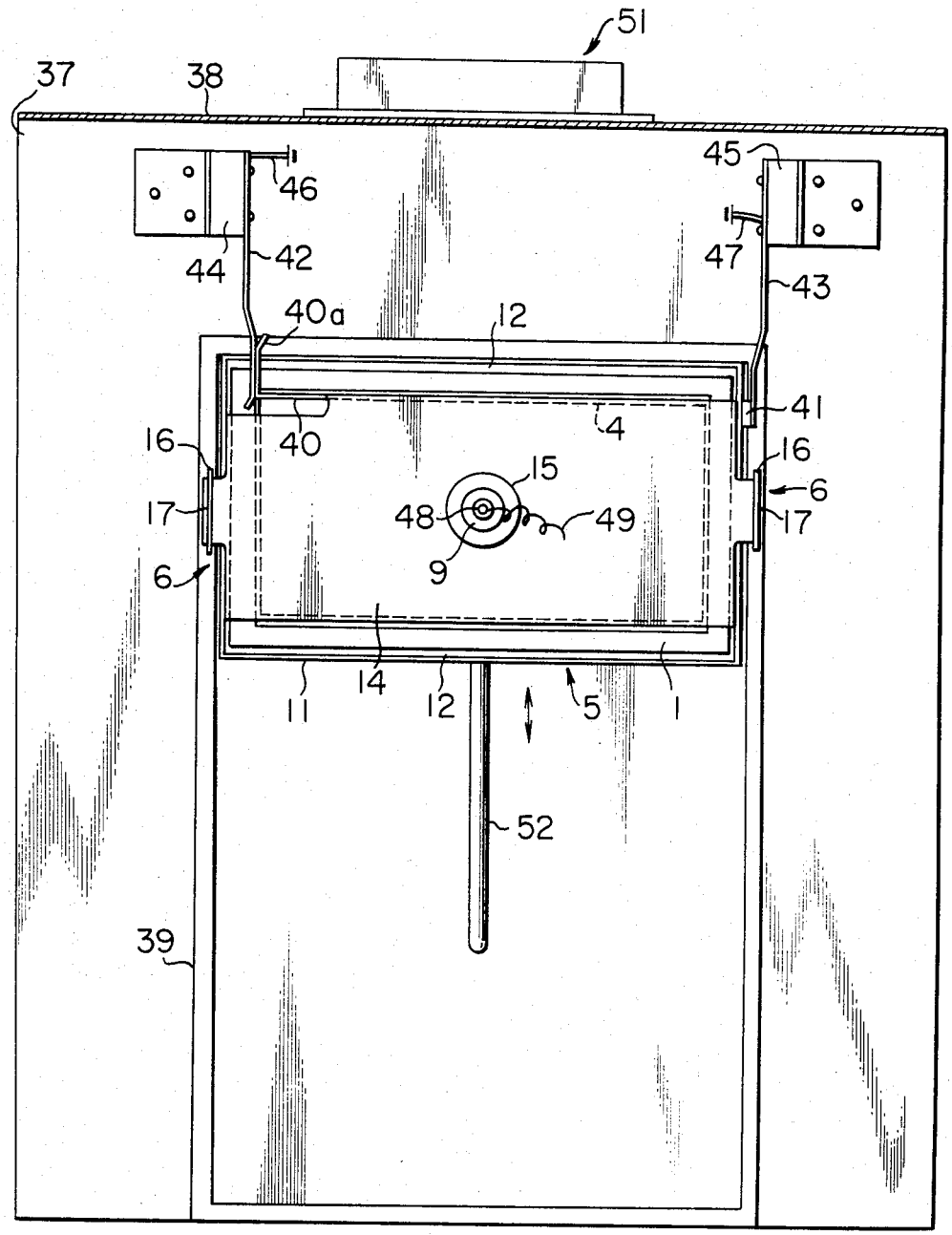
FIG. 13 is a sectional view taken along the line XIII—XIII in FIG. 12.
Figure 14:
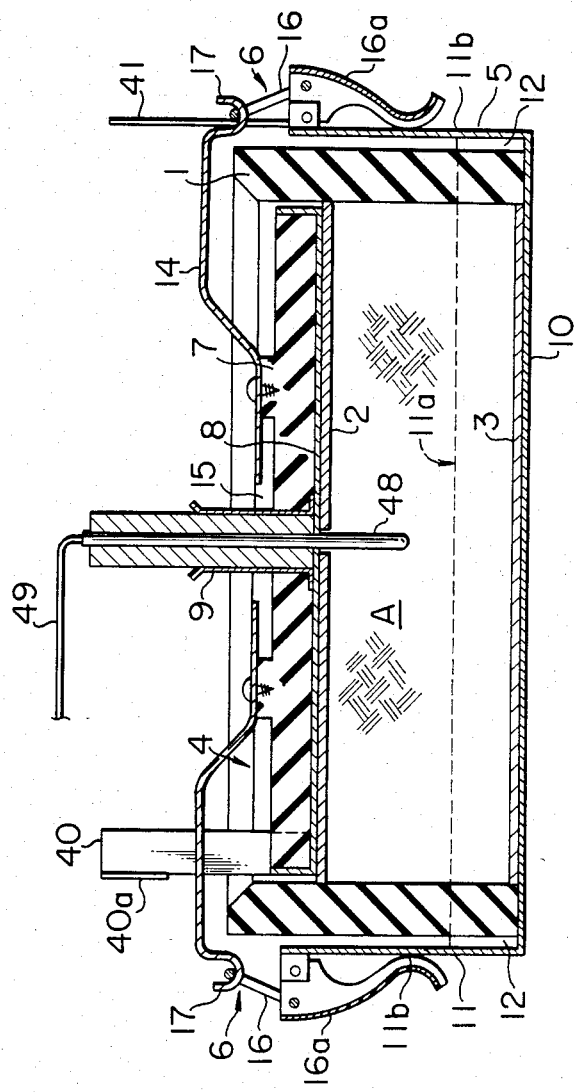
FIG. 14 is a vertical sectional front view of the apparatus shown in FIG. 12, showing the essential portions of the apparatus having a raw material placed in the insulating container in a pressed condition.
Figure 15:
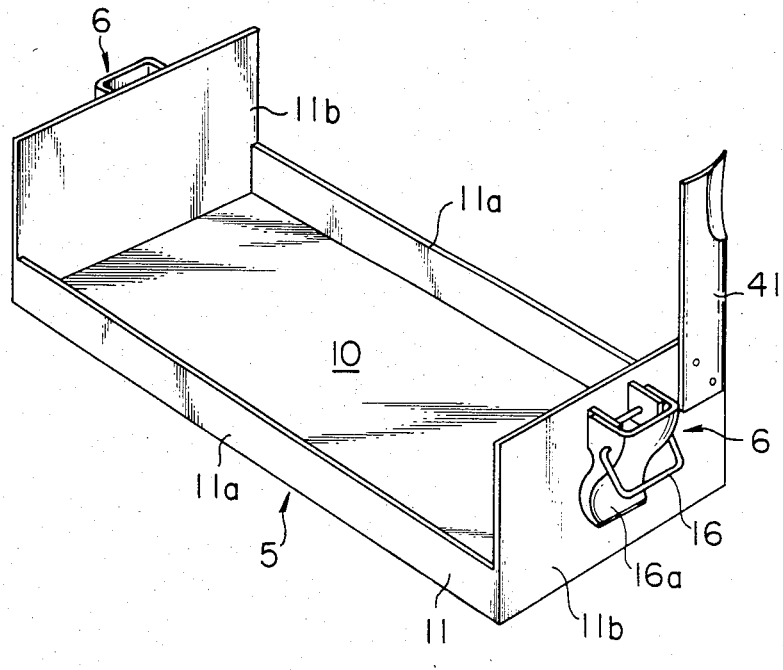
FIG. 15 is a perspective view, on an enlarged scale, of the lower electrode member serving concurrently as a juice receiver used with the apparatus shown in FIG. 12.
Figure 16:
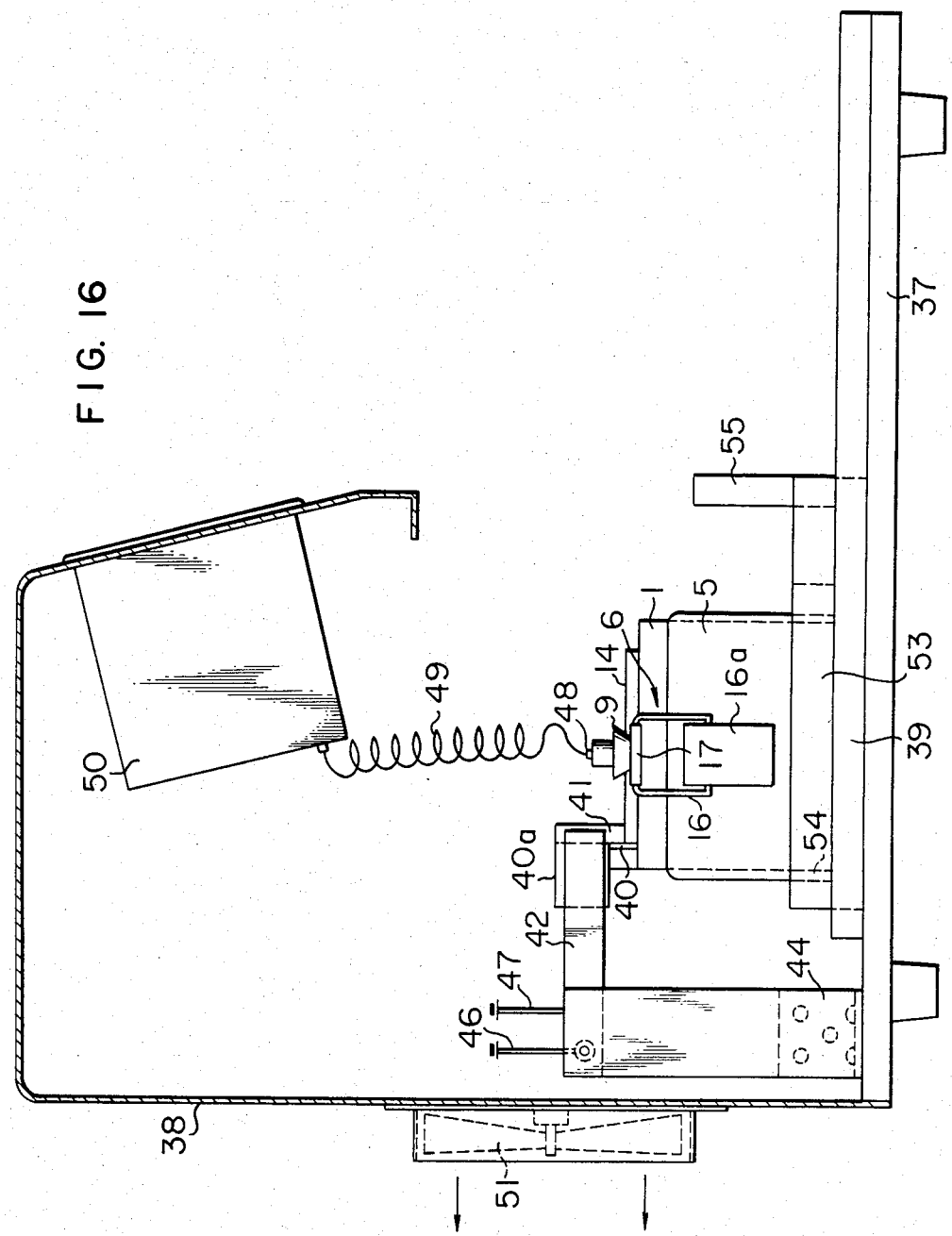
FIG. 16 is a side view of the apparatus for producing processed foodstuffs by passing a current to raw materials to be processed comprising still another embodiment.
Figure 17:
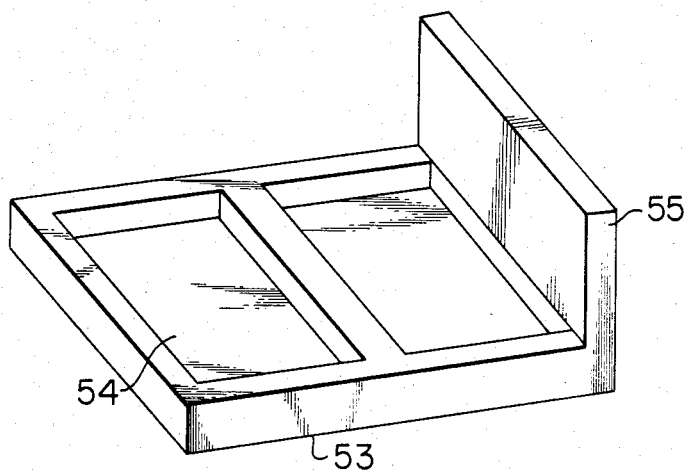
FIG. 17 is a perspective view, on an enlarged scale, of the insulating slidable holding member used with the apparatus shown in FIG. 16.

FIGS. 16 and 17 show still another embodiment of the apparatus for producing processed foodstuffs by passing a current to materials to be processed which is suitable for carrying the method according to the invention into practice. In this embodiment, the insulating container having a raw material A held between the upper electrode member and the lower electrode member serving concurrently as juice receiver placed therein can be moved from the front of the worktable to the rear thereof and vice versa without using the handle 52 shown in FIG. 12, with increased safety. To this end, an insulating slidable holding member 53 of a width corresponding to that of the guide frame 39 described by referring to FIG. 12 is placed on the top surface of the worktable 37. The insulating slidable holding member 53 is formed with receases 54 each for holding the insulating container 1 therein. The insulating container 1 having a raw material A held between the upper electrode member 4 and the lower electrode member 5 serving concurrently as a juice receiver placed therein can be freely inserted in and withdrawn from each recess 54. A handle 55 for moving the holding member 53 is attached to a front side thereof for the operator to grip.

Operation of the embodiments of the processed foodstuff producing apparatus in conformity with the invention will be described. When the appratus shown in FIGS. 1–5 is operated to produce processed foodstuffs by passing a current to materials to be processed, the salt water containing contact members 2 and 3 are placed on upper and lower sides respectively of the raw material A placed in the insulating container 1 which is open on upper and lower sides. Then, the upper electrode member 4 is inserted in the insulating container 1 through its open upper side and placed on a top surface of the upper contact member 2, and the lower electrode member 5 serving concurrently as a juice receiver is fitted to the open lower side of the insulating container 1 in a manner to support a lower portion of the insulating container 1 on the shoulders 13 of the electrode member 5 against back-and-forth and left-to-right movement. Thereafter, the lock members 16 of the resilient connection means 6 are brought into engagement with the respective hooked portions 17 of the plate springs 14 located on the right and left sides, and the pivotable knobs 16a are actuated to resiliently connect together the upper electrode member 4 and the lower electrode member serving concurrently as a juice receiver to thereby connect the plate springs 14 to the pivotable knobs 16a in an insulated condition.

Thus, the upper electrode member 4 and the lower electrode member 5 serving concurrently as a juice receiver are resiliently connected together in an insulated condition by the resilient connection means 6, so that suitable pressure is applied uniformly to the raw material A on both sides thereof and the upper electrode member 4 and the lower electrode member 5 serving concurrently as a juice receiver are uniformly brought into contact with the raw material A through the respective salt water containing contact members 2 and 3 on the opposite sides thereof. In performing the operation of producing processed foodstuffs by the method and apparatus according to the invention, a large number of insulating containers 1 each having the raw material A held between the upper electrode member 4 and the lower electrode member 5 serving concurrently as a juice receiver through the respective salt water containing member 2 and 3 placed therein are prepared to be ready for operation.

When each of the insulating containers 1 containing the raw material A arranged as aforesaid is placed on the worktable 24 in such a manner that the bottom plate 10 of the lower electrode member 5 serving as a juice receiver is brought into contact with the electrode contact member 26, the plug 18 provided with the probe 21 is inserted in the socket 9 on the upper electrode member 4 and a current is passed through the respective lead wires 22, 23 and 24. This allows a current to be uniformly passed between the upper electrode member 4 and the lower electrode member 5 serving concurrently as a juice receiver, so that Joule heat is generated in the raw material A to sterilize it. When the current is passed to the raw material A, the forward end of the probe 21 is located substantially in the central portion of the raw material A. This makes it possible for the operator to check in chronological sequence the temperature to which the raw material A is heated to permit a processed foodstuff of high flavor to be readily, quickly and efficiently produced by cutting off the current passed to the raw material A as soon as a predetermined temperature level is reached.

In the event that the raw material A for producing processed foodstuff tends to be expanded by heat generated by a current passed thereto, overexpansion of the material which might lead to its rupture can be avoided by virtue of the function of the resilient connection means 6 applying suitable pressure to the upper electrode member 4 to hold the raw material A between it and the lower electrode member 5 serving concurrently as a juice receiver in an optimally pressed condition, to enable a processed foodstuff of high quality to be produced. In addition, juices given off by the raw material A are all received by the lower electrode member 5 serving concurrently as a juice receiver and collect in the juice trap 12 to be stored therein. This is conducive to prevention of the occurrence of injury to the operator and damage to the apparatus which might otherwise be caused by a short circuit and eliminates the trouble of having to clean the parts of the apparatus soiled by the leaking juices, to allow the operation of producing processed foodstuffs by passing a current to the materials to be continuously performed in a sanitary and safe condition. If a multiplicity of electrode contact members 25 are provided on the worktable 24 and the operation of passing a current to each of the raw materials A placed in the multiplicity of insulating containers 1, then a multiplicity of processed foodstuffs can be produced at a time with a high degree of efficiency, so that the end of producing processed foodstuffs on a mass production basis can be attained by a apparatus of simple construction.

The operation of producing processed foodstuffs of high flavor by using the apparatus shown in FIGS. 12-15 wherein the insulating container having the raw material A placed therein is heated to a predetermined temperature while being moved on the worktable 37 will now be described. As is the case with the operation performed by using the apparatus shown in FIGS. 1-5, the raw material A is placed in the insulating container 1 which is open at the top and bottom and the upper electrode member 4 and the lower electrode member 5 serving as a juice receiver are placed on the upper and lower sides of the raw material A through the salt containing contact members 2 and 3 respectively. Then, the upper electrode member 4 and the lower electrode member 5 serving concurrently as a juice receiver are resiliently connected together by the resilient connection means 6 in an insulated condition to uniformly apply pressure to the raw material A from above and below. A multiplicity of such material containing insulating containers 1 are prepared. One of the material containing insulating container 1 is place in the front of the worktable 37 in a position disposed in the guide frame 39, and the probe 48 is inserted in the socket 9 on the upper electrode member 4 in such a manner that the forward end of the probe 48 is located substantially in the central portion of the raw material A. Upon finishing the insertion of the probe 48, the handle 52 is gripped by the operator and pushed to move the insulating container 1 in the guide frame 39 on the worktable 37 to the rear thereof to a predetermined position where the insulating container 1 is brought to a halt. The rearward movement of the insulating container 1 brings the contact piece and vertical contact member 40a and 41 into contact with the pair of current passing plates 42 and 43 respectively, so that a current is passed between the upper electrode member 4 and the lower electrode member 5 serving concurrently as a juice receiver to generate Joule heat in the raw material A to sterilize it. The probe 48 inserted substantially into the central portion of the raw material A monitors the temperature to which the material is heated. As soon as the probe 48 detects that the temperature has reached the predetermined level, the temperature sensor 50 is actuated to cut off the supply of current, thereby terminating the operation of passing a current to the insulating container 1.

Then, the handle 52 is manipulated by the operator again to return the insulating container 1 to the original position in the front of the worktable 37 as guided by the guide frame 39, to release the contact piece and contact member 40a and 41 from contact with the current passig plates 42 and 43 respectively. Thereafter, the probe 48 is withdrawn from the socket 9. Thus, a processed foodstuff of high flavor and suitable firmness can be produced readily, quickly and efficiently. By repeating the aofresaid process of passing a current to the raw material A contained in the insulating container 1, the raw materials A contained in the multiplicity of insulating containers 1 as described hereinabove can be processed in like manner one after another. Thus, processed foodstuffs can be produced in uniform quality with increased safety to the operator.

In the apparatus shown in FIGS. 12-15 too, overexpansion of the raw material A which might otherwise be caused by the heating can be avoided by virtue of the action of the resilient connection means 6 which resiliently connect together the upper electrode member 4 and the lower electrode member 5 serving as a juice receiver to hold the raw material A therebetweeen in a suitably pressed condition, so that rupture of the raw material A can be avoided. Moreover, juices given off by the raw material A are all recieved by the lower electrode member 5 and kept from leaking to outside. Thus, the operation can be performed in a safe and sanitary condition with a high degree of efficiency because injury to the operator and damage to the apparatus due to the occurrence of a short circuit caused by the juices leaking to outside can be avoided and the need to clean the parts of the apparatus by wiping off the juices can be eliminated in producing processed foodstuffs on a mass production basis.

When it is desired to produce processed foodstuffs by passing a current to raw materials by using the apparatus shown in FIG. 16, the following operation is performed. The insulating container 1 having the raw material A contained therein in a suitably pressed condition is put in one of the recesses 54 of the insulating slidable holding member 53 located in a position in the guide frame 39 disposed in the front of the worktable 37. After the probe 48 is inserted in the socket 9, the handle 55 is manipulated to move the insulating slidable holding member 53 to the rear of the worktable 37 as it is guided by the guide frame 39. This brings the contact piece 40a and vertical contact plate 41 into contact with the pair of current passing plates 42 and 43 respectively, to pass a current between the upper electrode member 4 and the lower electrode member 5 serving as a juice receiver to generate Joule heat in the raw material A to sterilize it. The temperature to which the raw material A is heated is monitored by the probe 48 which checks the temperature and actuates the temperature sensor 50 when the temperature has reached the predetermined level to cut off the current supply. Thereafter, the handle 55 is manipulated again to return the insulating slidable holding member 53 from the rear of the worktable 37 to the front thereof as guided by the guide frame 39, to the initial position in which the probe 48 is withdrawn from the socket 9 in which the probe 48 is withdrawn from the socket 9 and the insulating container 1 is removed from the section 54 of the insulating slidable holding member 53.

The apparatus for producing processed foodstuffs shown in FIGS. 16 and 17 and described hereinabove enables safety of the operator to be improved when the operation of processing the raw material A is performed as compared with the apparatus shown in FIGS. 1-5 and 12-15.

The method of and the apparatus for producing processed foodstuffs by passing a current to raw materials according to the invention offer many advantages. The invention eliminates the need to provide means for moving the upper electrode member 4 and the lower electrode member 5 serving concurrently as a juice receiver back and forth in reciprocatory movement each time the operation is performed, to hold the raw material A contained in the insulating container 1 therebetween and pass a current thereto. This reduces the number of process steps of the method for processing the materials and renders the apparatus for processing the materials simple in construction, thereby reducing production costs. The raw material A uniformly pressed between the upper electrode member 4 and the lower electrode member 5 serving as a juice receiver can be heated to a desired temperature to sterilize it merely by inserting the plug 18 in the socket 9 or moving the insulating container 1 from the front of the worktable 37 to the rear thereof, to enable processed foodstuffs of uniform quality to be produced safely and efficiently. Even if the raw material A shows a tendency to expand while a current is being passed thereto to heat it, overexpansion of the raw material A is prevented by the action of the resilient connection means 6 resiliently connecting together the upper electrode member 4 and the lower electrode member 5 serving concurrently as a juice receiver, to avoid rupture of the raw material A due to overexpansion and produce processed foodstuffs of high flavor and uniform quality. The provision of the juice trap 12 to the lower electrode member 5 serving concurrently as a juice receiver keeps juices given off by the raw material A while it is being processed by a current passed thereto from leaking to outside and eliminates the need to clean the parts of the apparatus by wiping the juices off while avoiding injury to the operator and damage to the apparatus that might otherwise occur due to a short circuit caused by leaks of juices, thereby improving the sanitary condition and the safety of operation of producing processed foodstuffs by passing a current to raw materials. The provision of the probe 21, 48 for monitoring and checking the temperature to which the raw material A is heated makes it possible to positively control the temperature to which the raw material A is heated, to thereby allow processed foodstuffs of uniform quality to be produced by passing a current to the raw materials A. In the embodiment of the invention in which the insulating container 1 is moved on the worktable 37 in reciprocatory movement to produce processed foodstuffs by passing a current to the raw materials A, the risk of the operator being injured by a short circuit can be avoided by separately performing the operation of inserting the probe 48 in the socket 9 in the front of the worktable 37 and the operation of passing a current to the upper electrode member 4 and the lower electrode member 5 serving as a juice receiver at the rear of the worktable 37, thereby improving the safety and efficiency of operation.

What is claimed is:

1. A method of producing a processed foodstuff by passing a current to a raw food material comprising the steps of:
    holding the raw food material placed in an insulating container open on upper and lower sides between an upper electrode member and a lower electrode member serving concurrently as a receiver of juices given off by the raw food material located on opposite sides of the raw food material through respective salt water containing contact members, said upper electrode member and lower electrode member being resiliently connected together in an insulated condition; and
    passing a current between the upper electrode member and lower electrode member to heat the raw food material to sterilize it while allowing juices given off by the raw food material to be received by the lower electrode member and collect in a juice trap provided between the lower electrode member and the insulating container.

2. A method of producing a processed foodstuff by passing a current to a raw food material as claimed in claim 1, wherein said step of passing a current between the upper electrode member and lower electrode member is a step in which a plug provided with a probe for checking the temperature to which the raw food material is heated to determine if a predetermined temperature level has been reached to thereby satisfactorily process the raw food material to sterilize it.

3. A method of producing a processed foodstuff by passing a current to a raw food material comprising the steps of:
    placing in the front of a worktable an insulating container containing the raw food material held between an upper electrode member and a lower electrode member serving concurrently is a receiver of juices given off by the raw food material;
    inserting in a socket provided to the upper electrode member a probe for checking the temperature to which the raw food material is heated to determine if a predetermined temperature level has been reached; and
    moving the insulating container to the rear of the worktable into contact with current collecting plates to pass a current between the upper electrode member and lower electrode member to thereby heat the raw food material to the predetermined temperature level to sterilize it.

4. An apparatus for producing a processed foodstuff by passing a current to a raw food material comprising:
    an insulating container open on upper and lower sides for containing the raw food material;
    an upper electrode member and a lower electrode member serving concurrently as a receiver of juices given off by the raw food material placed in contact with opposite sides of the raw food material through salt water containing contact members respectively;
    resilient connection means connecting the upper electrode member and lower electrode member together in an insulated condition to apply pressure uniformly to the raw food material; and
    an enclosure surrounding the insulating container provided to the lower electrode member serving concurrently as a receiver of juices given off by the raw food material to define a juice trap.

5. An apparatus for producing a processed foodstuff by passing a current to a raw food material as claimed in claim 4, further comprising a socket provided to the upper electrode member for a plug to be inserted therein and withdrawn therefrom, said plug having attached thereto a probe for checking the temperature to which the raw food material is heated to determine if a predetermined temperature level has been reached, to thereby satisfactorily process the raw food material to sterilize it.

6. An apparatus for producing a processed foodstuff by passing a current to a raw food material comprising:
    an insulating container open on upper and lower sides for containing the raw food material;
    an upper electrode member and a lower electrode member serving concurrently as a receiver of juices given off by the raw food material placed in contact with opposite sides of the raw food material through salt water containing contact members respectively;
    resilient connection means connecting the upper electrode member and lower electrode member together in an insulated condition to apply pressure uniformly to the raw food material;
    an enclosure surrounding the insulating container provided to the lower electrode member serving concurrently as a receiver of juices given off by the raw food material to define a juice trap;
    a worktable for placing said insulating container thereon for movement from the front of the worktable to the rear thereof and back to the front in reciprocatory movement;

a socket provided to the upper electrode member for a plug to be inserted therein and withdrawn therefrom, said plug having attached thereto a probe for checking the temperature to which the raw food material is heated to determine if a predetermined temperature level has been reached; and a pair of current passing plates located at the rear of the worktable with which the insulating contact member is brought into contact when moved to a predetermined position at the rear of the worktable to thereby pass a current between the upper electrode member and lower electrode member serving concurrently as a receiver of juices given off by the raw food material.

* * * * *